(12) United States Patent
Gross et al.

(10) Patent No.: US 6,556,809 B1
(45) Date of Patent: Apr. 29, 2003

(54) METHOD AND APPARATUS FOR CONTROLLING COMMUNICATION BEAMS WITHIN A CELLULAR COMMUNICATION SYSTEM

(75) Inventors: Jonathan Henry Gross, Gilbert, AZ (US); Shawn Hogberg, Chandler, AZ (US); James William Startup, Tempe, AZ (US); Robert Anthony Peters, Silver Spring, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/447,313

(22) Filed: Nov. 22, 1999

(51) Int. Cl.[7] .............................................. H04B 7/185
(52) U.S. Cl. .................. 455/12.1; 455/13.3; 455/278.1; 455/562
(58) Field of Search ................................ 455/13.1, 12.1, 455/11.1, 13.3, 13.4, 19, 21, 13.2, 276.1, 277.1, 277.2, 278.1, 279.1, 562, 22, 23, 24, 25, 501; 342/371, 373, 372; 375/347, 349

(56) References Cited

U.S. PATENT DOCUMENTS

| | | | | |
|---|---|---|---|---|
| 4,771,289 A | * | 9/1988 | Masak et al. | 342/383 |
| 5,856,804 A | * | 1/1999 | Turcotte et al. | 342/371 |
| 5,966,371 A | * | 10/1999 | Sherman | 455/12.1 |
| 6,016,124 A | * | 1/2000 | Lo et al. | 342/373 |
| 6,047,162 A | * | 4/2000 | Lazaris-Brunner et al. | 455/12.1 |
| 6,240,072 B1 | * | 5/2001 | Lo et al. | 455/13.1 |

* cited by examiner

*Primary Examiner*—Vivian Chin
*Assistant Examiner*—John J Lee
(74) *Attorney, Agent, or Firm*—Ingrassia Fisher & Lorenz

(57) ABSTRACT

A beam control subsystem (200, FIG. 2) provides acquisition, synchronization, and traffic beams (142, FIG. 1) to communication devices (130) within a footprint (144) of a system node (110), where each beam comprises a set of beamlets (140). The subsystem (200, FIG. 2) first acquires (302, FIG. 3) and synchronizes (304, FIG. 3 and FIG. 6) with each communication device. Acquisition involves selecting (402, 416, FIG. 4) and combining (404) sets of beamlets (506, 510, FIG. 5), and determining whether any devices within the sets are attempting to acquire the system. If so, synchronization is performed by varying (604, FIG. 6) beamlet weighting coefficients to find, based on modem feedback, a combination of coefficients that yields a maximum signal-to-interference+noise ratio for multiple users within a beam. The communication device is then handed off (612, 614) to a traffic beam. The subsystem (200) continues, based on modem feedback, to adapt (802, 804, FIG. 8) beamlet weighting coefficients in order to track the traffic beam in a manner that provides the maximum SINR.

12 Claims, 5 Drawing Sheets

METHOD AND APPARATUS FOR CONTROLLING COMMUNICATION BEAMS WITHIN A CELLULAR COMMUNICATION SYSTEM

FIELD OF THE INVENTION

The invention relates generally to providing, by a cellular communication system, communication channels to terrestrial-based communication devices. More particularly, the invention relates to acquiring, synchronizing, and tracking communication devices using digital beamforming apparatuses and techniques in a satellite cellular communication system.

BACKGROUND OF THE INVENTION

Current satellite cellular communication systems use either satellite-fixed or earth-fixed beams, within which communication channels are provided to users of the system. In a system using satellite-fixed beams, the beams projected by the satellite are fixed with respect to the satellite and move across the surface of the earth in accordance with the velocity vector of the satellite. Thus, in these systems, frequent handoffs of communication channels are necessary between beams of a particular satellite and between satellites.

In a system using earth-fixed beams, a satellite steers each beam toward a particular geographical region during the satellite's pass over that region. Thus, even though the satellite is moving with respect to the surface of the earth, the beam footprints projected by that satellite do not move substantially with respect to the earth's surface. Although handoffs between beams are less frequent in these systems, handoffs between satellites are necessary as one satellite passes out of view of a geographical region.

Each of these types of systems typically employs phased array antennas and digital beamforming techniques to steer the beams and/or to provide communication channels within the beams. The signal strength within each beam is typically of uniform distribution. Thus, with respect to signal power allocation, these systems are naturally inefficient, because relatively strong beams are provided in areas where few or no users exist, and the systems have no ability to target stronger signals toward areas where the users are. Therefore, it is desirable to increase signal strength in the direction of users, while minimizing signal strength in areas where no users exist.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

The ensuing detailed description of the drawings provides preferred exemplary embodiments only, and is not intended to limit the scope, applicability, or configuration of the invention in any way. Rather, the ensuing detailed description of the drawings will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

Figure 1:
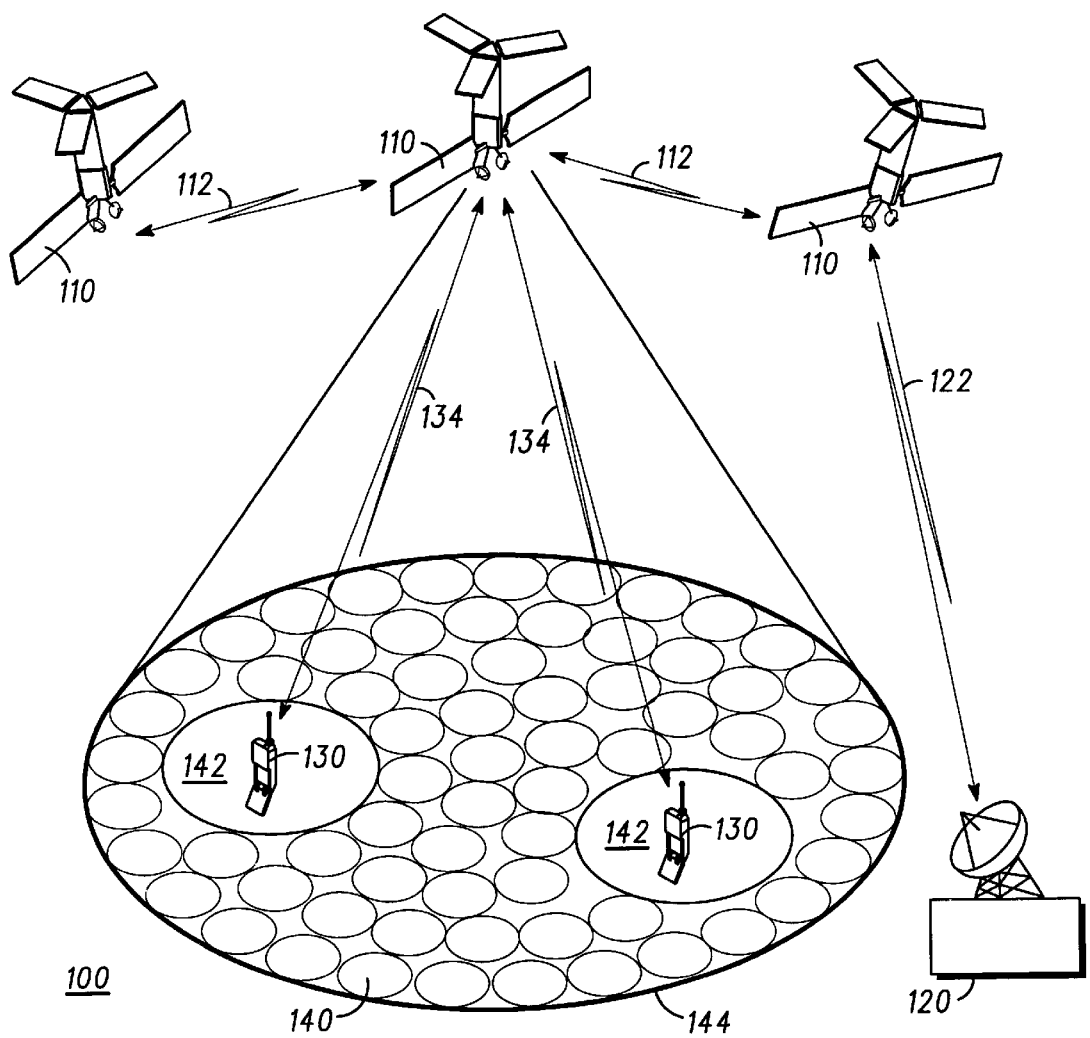
FIG. 1 illustrates a portion of a satellite communication system in accordance with a preferred embodiment of the present invention.

FIG. 1 illustrates a portion of a satellite communication system in accordance with a preferred embodiment of the present invention. Satellite communication system 100 includes at least one satellite 110, at least one ground station 120, and at least one communication device 130. Although FIG. 1 illustrates three satellites 110, one ground station 120, and two communication devices 130, more or fewer of these system elements could be included in the system. Most likely, the system would provide communications capabilities to hundreds or thousands of communication devices.

In a preferred embodiment, satellites 110 are system nodes used to route user data and system control data, such as telemetry, tracking and control data, throughout the network. In a preferred embodiment, satellites 110 communicate with each other over crosslinks 112. Crosslinks 112 enable user data to be routed rapidly through the satellite network. In alternate embodiments, satellites 110 could communicate with each other over bent-pipe links (not shown) via communication equipment (not shown) on the ground. In other alternate embodiments, terrestrial links could be used to route some user and/or system control data throughout the network.

In alternate embodiments corresponding to ground-based or airborne cellular systems, other system nodes besides satellites could perform some or all of the functions provided by satellites as described herein. For example, in a ground-based cellular system, components of a cellular base station could perform some or all of the satellite functions.

At least some of satellites 110 communicate with ground station 120 through feeder links 122. In a preferred embodiment, ground station 120 monitors satellite health and telemetry information and other system information, and it controls operations of the network. Network control is accomplished, in part, by sending commands to satellites 110 through feeder link 122. Commands may be sent directly to each satellite 110 over a feeder link 122, or they may be sent to a subset of satellites 110, which thereafter route the commands to other satellites through crosslinks 112.

Satellites 110 also communicate with communication devices 130, which could be, for example, handheld cellular telephones, radios of any type, pagers, personal computers of any type, or any other type of one-way or bi-directional communication devices. Satellites 110 communicate with user communication devices 130 via links 134, which could be one-way or bidirectional links.

Generally, each satellite 110 will communicate with communication devices 130 only within the system-designed field of view, or footprint 144, of the satellite. In a preferred embodiment, within each footprint 144, multiple "beamlets" 140 are projected by satellite 110 toward the ground. Within each beamlet 140, one or more channels are provided within a relatively small area on the ground. Because beamlets 140 are dimensionally narrow, channels within a beamlet 140 are likely to have poor sidelobe characteristics and be subject to interference.

In order to provide a set of interference-resistant channels to a larger area on the ground, multiple beamlets 140 are combined together to form beams 142 in a preferred embodiment. Thus, each beam 142 is comprised of a subset of the beamlets 140 within footprint 144. Desirably, each beam 142 is optimized for signal gain and coverage area, and it has sidelobe properties that minimize interference. Thus, although a beam 142 has the same spectral characteristics as its component beamlets 140, each beam 142 is dimensionally wider than a single beamlet 140.

In a preferred embodiment, at least three types of beams are provided by the satellite within its footprint 144. First, an acquisition beam is provided to determine whether any new communication devices are attempting to acquire the system. Second, a synchronization beam is provided in order to determine the area in which the system should provide a high-gain spot beam toward the new communication device. Third, a traffic beam is provided in the direction of the spot beam. Within the traffic beam, the satellite provides one or more communication channels to one or more communication devices located within the area covered by the traffic beam. Desirably, none of the channels within a traffic beam, or within an adjacent or overlapping beam, would interfere with each other.

In a preferred embodiment, sets of beamlets 140 are combined together to form beams 142 that cover specific geographical areas where users are located. In addition, as will be described in detail below, the weighting, or the signal strength, of each beamlet 140 is individually controllable in order to provide high-gain signals to those users and to minimize interference.

Figure 2:
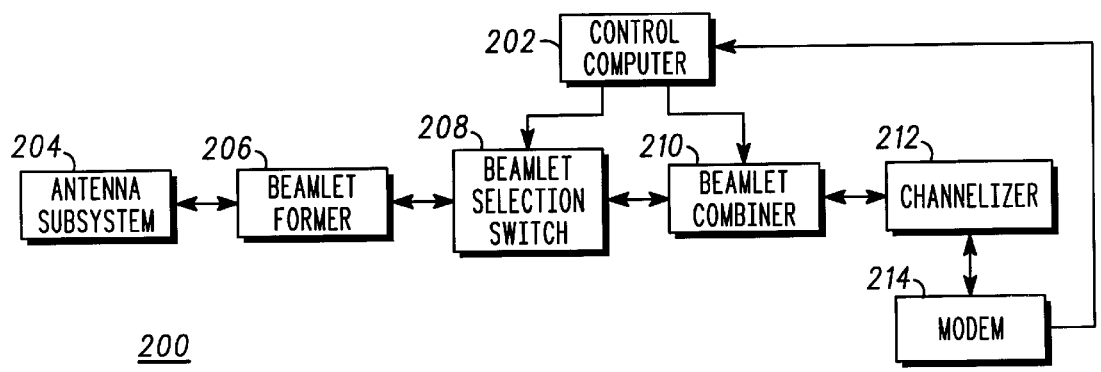
FIG. 2 illustrates a simplified block diagram of a satellite beamforming subsystem in accordance with a preferred embodiment of the present invention.

Each beamlet 140 and beam 142 is generated by a satellite beamforming subsystem. FIG. 2 illustrates a simplified block diagram of a satellite beamforming subsystem in accordance with a preferred embodiment of the present invention. In a preferred embodiment, all elements of subsystem 200 are resident on-board a satellite (110, FIG. 1). In various alternate embodiments, some functions performed by the elements of subsystem 200 could be performed by terrestrial-based equipment or by other satellites.

Subsystem 200 includes control computer 202, antenna subsystem 204, beamlet former 206, beamlet selection switch 208, beamlet combiner 210, channelizer 212, and modem 214. When signals are transmitted by the satellite to ground equipment, those signals follow a path from modem 214 to channelizer 212 to beamlet combiner 210 to beamlet selection switch 208 to beamlet former 206 and to antenna subsystem 204. In receive mode, signals follow the opposite path. For ease of description, the subsystem components are described in the context of receiving signals. Based on the description, the complementary functions performed by the subsystem components could be easily inferred by one of skill in the art.

Antenna subsystem 204 provides communication channels to communication devices 130 (FIG. 1) within one or more beams 142 (FIG. 1). Subsystem 204 is a phased array antenna which includes antenna elements and low noise amplifiers. In addition, subsystem 204 could include digital-to-analog and analog-to-digital converters and filtering means, although other subsystems also could provide these functions.

Antenna subsystem 204 sends and receives signals to and from beamlet former 206. Beamlet former 206 comprises a two-dimensional Fast Fourier Transform in a preferred embodiment, although in alternate embodiments it could comprise a Butler matrix or other transform algorithm and hardware. Beamlet former 206 performs an orthogonal transformation of the antenna signals to form a set of maximum-gain beamlets (140, FIG. 1) that span the satellite footprint (144, FIG. 1).

As described previously, the method and apparatus of the present invention efficiently provide directional, high-gain beams to geographical areas where communication devices are communicating with the network. Essentially, this is accomplished by first acquiring and synchronizing with the communication device, then tracking that device while it is communicating with the network. In accordance with a preferred embodiment, acquisition, synchronization, and tracking involve, in part, activating those beamlets that cover the geographical area that includes the communication device.

Activation of subsets of beamlets is accomplished using beamlet selection switch 208. Beamlet selection switch 208 activates (or deactivates) the available beamlets formed by beamlet former 206. A "set" of beamlets is defined herein as a group of available beamlets that are adjacent to one another. Each set of activated beamlets forms a single beam (142, FIG. 1).

In accordance with a preferred embodiment, during synchronization and tracking, the relative signal strength of each beamlet is varied via a complex weighting (magnitude and/or phase) coefficient. Thus, within a single beam, the signal strengths of some beamlets can be stronger than the signal strengths of other beamlets. This enables the system to shape the mainlobe and sidelobe regions of the beam in order to provide high-gain signals to communication devices within a certain portion of each beam, while providing low-gain signals outside the area where the communication devices are located. This provides the advantages of maximizing the SINR while minimizing interference and efficiently using available power.

Varying the beamlet strengths is performed by beamlet combiner 210. In accordance with a preferred embodiment, beamlet combiner 210 applies a magnitude and phase weighting to each beamlet selected by beamlet selection switch 208, and sums, or combines, the weighted outputs from the selected beamlets to form a beam.

Next, channelizer 212 takes the full spectrum from each beam and divides it into channels suitable for demodulation by modem 214. In transmit mode, the beamlet combiner 210 weights the output from channelizer 212 and provides a weighted output to one or more beamlets in order to form a transmit beam. In a preferred embodiment, the transmit beamlet weighting is the same as the receive beamlet weighting, although they could be different in an alternate embodiment.

Control computer 202 controls beamlet selection switch 208 and beamlet combiner 210. In accordance with a preferred embodiment, control computer 202 determines which beamlets should be activated or deactivated, and what weighting coefficients to apply to each activated beamlet. Control computer 202 then sends instructions or otherwise controls beamlet selection switch 208 and beamlet combiner 210.

In a preferred embodiment, control computer 202 determines the appropriate settings for beamlet activation and weighting coefficients by evaluating feedback received from modem 214. In a preferred embodiment, this feedback takes the form of mean square error measurements derived from reference signals embedded in the data stream. In alternate embodiments, the interaction between control computer 202 and modem 214 can be a decision-directed or some other type of feedback process known to those of skill in the art. Basically, the modem feedback is related to the SINRs of the signals received by the satellite.

In a preferred embodiment, the functions performed by control computer 202 are performed on board the satellite (110, FIG. 1). In various alternate embodiments, terrestrial equipment and/or other satellites could perform some or all control computer functions. In such embodiments, information vital to beamlet activation and weighting would be communicated to the satellite through feeder links 122 (FIG. 1) and/or crosslinks 112 (FIG. 1).

Figure 3:
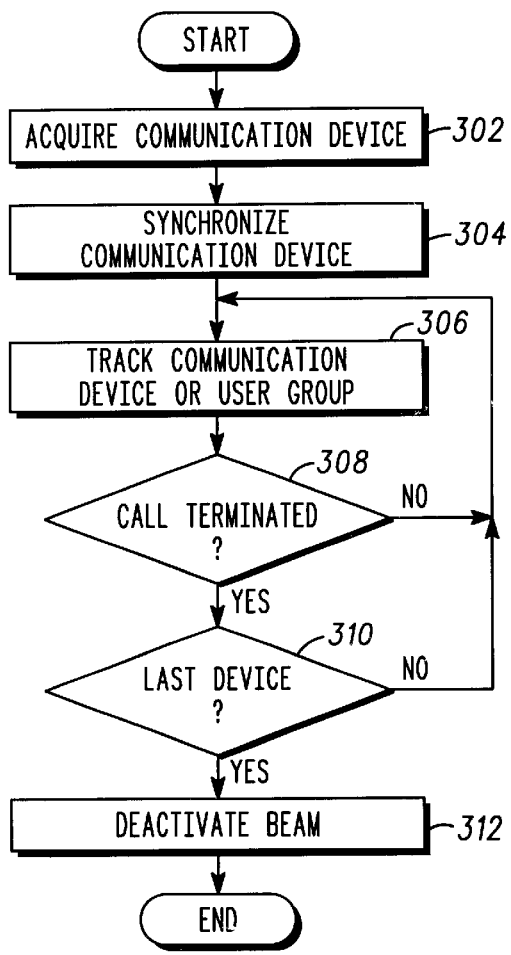
FIG. 3 illustrates a flowchart of a method for providing digital beamforming in accordance with a preferred embodiment of the present invention.

The method for providing digital beamforming in accordance with a preferred embodiment is described at a high level in FIG. 3 and in more detail in FIGS. 4–11.

FIG. 3 illustrates a flowchart of the method for providing digital beamforming in accordance with a preferred embodiment of the present invention. The method begins, in step 302, by acquiring a new communication device. Acquisition of a new communication device is performed by providing an acquisition beam comprised of a set of beamlets, and evaluating received signals within that acquisition beam to determine whether a new communication device exists within the beam. The acquisition beam is continuously scanned across the satellite footprint (144, FIG. 1). There may be more than one acquisition beam formed simultaneously within the satellite footprint (144, FIG. 1) to provide improved acquisition performance. The acquisition process is described in more detail in conjunction with FIGS. 4–5.

If a new communication device is acquired, then that communication device is synchronized, in step 304. This is accomplished by first providing a synchronization beam comprised of a set of beamlets in the area where the device is located. The weighting coefficients of the beamlets are then adapted until a maximum SINR is achieved. The communication device location can then be determined, and the communication device can be handed off to a traffic beam that services that location, or a new traffic beam can be created if no beam currently services the location. The synchronization process is described in more detail in conjunction with FIGS. 6–7.

After synchronization, a tracking process is implemented in step 306. The tracking process essentially involves adjusting beamlet activation status and weighting coefficients to account for satellite motion, modem feedback, and user migration. The tracking process is described in more detail in conjunction with FIGS. 8–11.

The system continues to track the communication device or user group until a communication device has terminated a call, as determined in step 308. If no communication device has terminated a call, the tracking process continues to be implemented. If a communication device has terminated a call, a determination is made, in step 310, whether the communication device was the last communication device within a user group serviced by the traffic beam. If not, the tracking process continues to be implemented. If the communication device was the last communication device within the user group, then that traffic beam is deactivated by deactivating the beamlets comprising the traffic beam, and the process ends. The tracking process is defined more fully in FIG. 8. In a preferred embodiment, the acquisition process (step 302) is implemented continuously as a parallel process with the communication device synchronization and tracking processes (steps 304 and 306). Thus, after synchronization and tracking of a new communication device commences, the acquisition process continues to execute in parallel with those processes, continuously scanning for new communication devices.

In addition, in a preferred embodiment, each satellite can provide multiple traffic beams within the satellite footprint. Each of the multiple traffic beams would be separately tracked during the time that communication devices exist within those beams. Thus, the tracking process for each beam also runs in parallel with the tracking processes for other active beams. FIGS. 4–11 illustrate the acquisition, synchronization, and tracking processes in detail.

Figure 4:
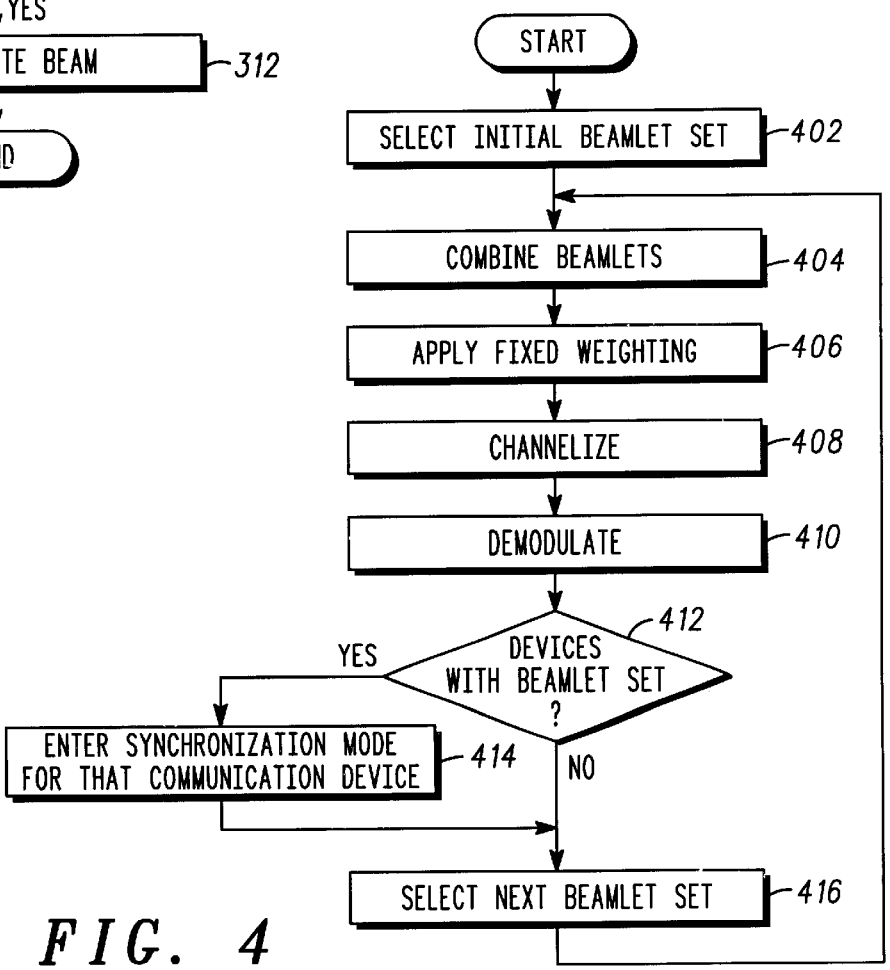
FIG. 4 illustrates a flowchart of a method for acquiring a communication device in accordance with a preferred embodiment of the present invention.

FIG. 4 illustrates a flowchart of a method for acquiring a communication device in accordance with a preferred embodiment of the present invention.

Essentially, the method involves detecting a communication device that is attempting to acquire the system by scanning the entire footprint for acquisition signals.

The method begins, in step 402, by selecting an initial beamlet set from the beamlets available in the satellite footprint. In a preferred embodiment, beamlet set selection is performed by the control computer (202, FIG. 2) indicating to the beamlet selection switch (208, FIG. 2) which of the available beamlets the switch should activate. Generally, the number of beamlets selected will be more than a single beamlet, yet of a small enough number to provide adequate array gain and acquisition link margin, as well as a rough approximation of a communication device's location within the footprint. For example, if 1000 beamlets are available within a satellite footprint, the initial beamlet set may include 50 beamlets, which would cover approximately five percent of the footprint area. Of course, more or fewer beamlets may exist within a satellite footprint, and more or fewer beamlets may be selected.

Figure 5:
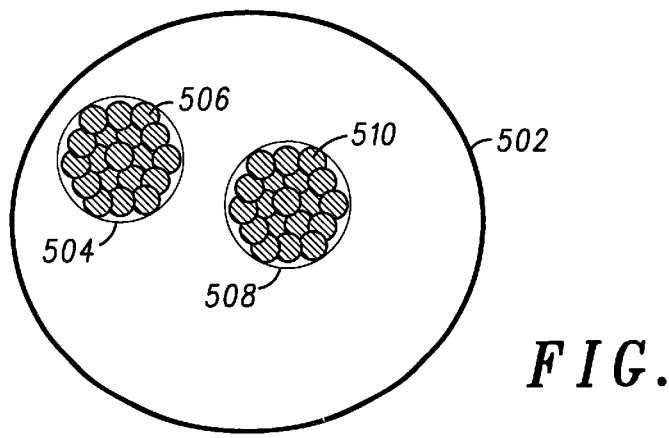
FIG. 5 illustrates an acquisition beam at first and second times in accordance with a preferred embodiment of the present invention.

After selection of the beamlet set, the beamlets are combined, in step 404, to form an "acquisition beam." In a preferred embodiment, the beamlet combiner (210, FIG. 2) combines the beamlets. FIG. 5 illustrates an acquisition beam, within footprint 502, at a first and second time in accordance with a preferred embodiment of the present invention. At a first time, acquisition beam 504 is comprised of a first set of beamlets 506. As will be described below, the first set of beamlets 506 is used to detect communication devices attempting to acquire the system. At a second time, acquisition beam 508 is comprised of a second set of beamlets 510, and that set of beamlets is used to detect communication devices attempting to acquire the system.

Referring back to FIG. 4, a fixed weighting is applied to the combined acquisition beam beamlets in step 406 by the beamlet combiner (210, FIG. 2). The fixed weighting may be uniform across the selected beamlets, or the weighting may vary across the beamlets. The term "fixed" as used herein means only that the weighting is not varied for the selected beams during the acquisition process in a preferred embodiment. In alternate embodiments, the weighting may be varied.

In step 408, the channelizer (212, FIG. 2) divides the combined beamlets into individual channels or groups of channels. Then, in step 410, the received signal is demodulated by the modem (214, FIG. 2). By demodulating and evaluating the received signal, the system can scan for communication devices attempting to acquire the system within the area covered by the selected beamlets.

In step 412, a determination is made whether the demodulated signal indicates that any communication devices are trying to acquire the system within the beamlet set's coverage area. If so, then the method enters a synchronization mode for that communication device in step 414. Synchronization of a communication device is described in detail in conjunction with FIGS. 6–7.

Synchronization for that communication device occurs in parallel to the continuation of the acquisition process. Thus, if no communication devices are detected in step 414, or after the synchronization mode has been initiated for a detected communication device, the method selects a next set of beamlets to use in step 416. In a preferred embodiment, the system selects an adjacent set of beamlets that does not substantially overlap the previous set of beamlets. In various alternate embodiments, the system could select non-adjacent beamlet sets, or it could select beamlet sets that partially overlap the previous set of beamlets.

After selecting the next set of beamlets, the method iterates as shown in FIG. 4, until all beamlet sets are used to scan an acquisition beam across the entire field of view. Thereafter, the method would start again with the initial beamlet set, continuously repeating the acquisition process in a preferred embodiment. In an alternate embodiment, the method may be repeated periodically, rather than continuously scanning the footprint. In another alternate embodiment, two or more beams using different sets of beamlets could be scanned in parallel, thus enabling the entire footprint to be scanned more rapidly.

Figure 6:
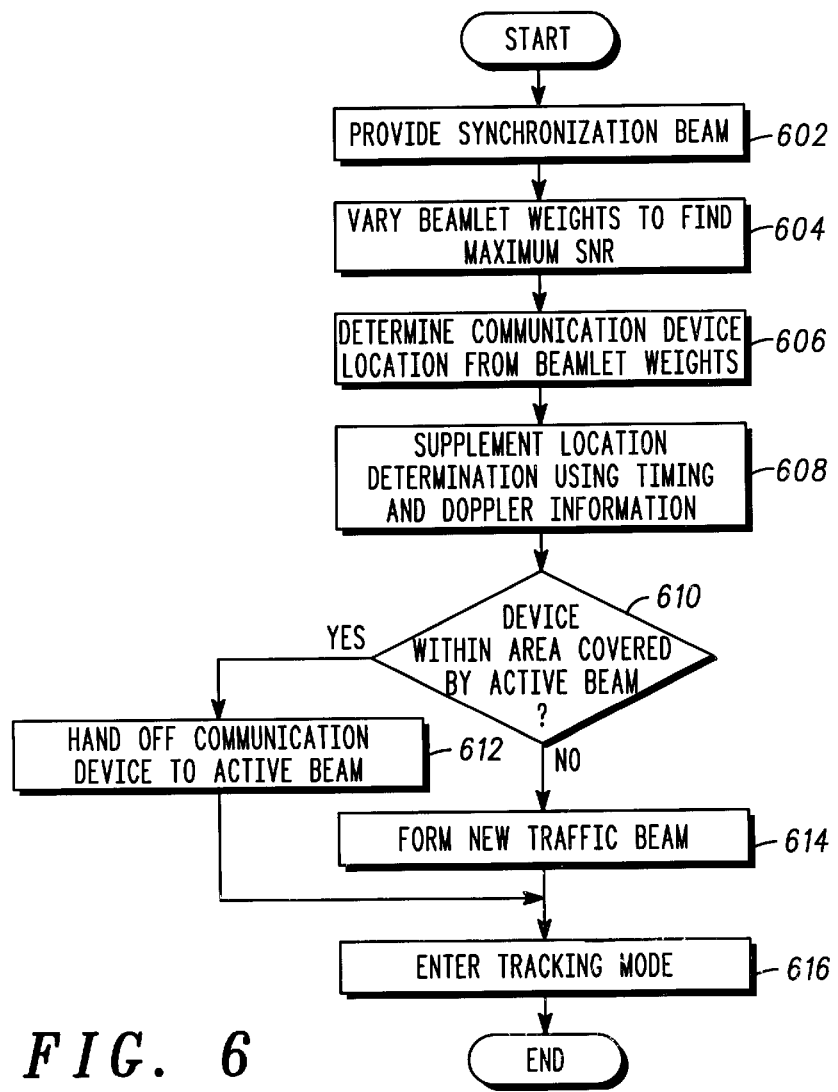
FIG. 6 illustrates a flowchart of a method for synchronizing a communication device in accordance with a preferred embodiment of the present invention.

After a communication device is detected during the acquisition process described above, the communication device is synchronized with the system. FIG. 6 illustrates a flowchart of a method for synchronizing a communication device in accordance with a preferred embodiment of the present invention. Essentially, the method involves adapting the set of beamlets used to detect the communication device's acquisition attempt, and adapting the weighting coefficients for those beamlets to maximize the SINR for the communication device within the beam.

The method begins, in step 602, by the satellite providing a synchronization beam. In a preferred embodiment, the synchronization beam is comprised of the set of beamlets within which the communication device was detected during acquisition mode (FIG. 4). In an alternate embodiment, the set of beamlets used to constitute the synchronization beam could vary somewhat from the beamlets in the acquisition beam, although it is desirable that most of the acquisition beam and synchronization beam beamlets be common.

During synchronization, the beamlet selection switch (208, FIG. 2) is fixed (i.e., the set of selected beamlets are activated during the entire synchronization process), but the weighting coefficients of the beamlets within the synchronization beam are varied. In step 604, in a preferred embodiment, the beamlet weighting coefficients are varied until the system finds a combination of coefficients that results in a maximum SINR for the communication device signal.

Determination of the maximum SINR is an iterative adaptive process. The satellite first adjusts the beamlet weighting coefficients in a manner that creates a high-gain spot beam within the beam, and then, based on modem feedback, the satellite determines the SINR for that beamlet weighting distribution. The satellite then adjusts the beamlet weighting coefficients based on error signal gradient, gradient approximations, solution space searches, or other methods, to improve the SINR. This process continues until the process converges at the maximum SINR solution.

In a preferred embodiment, feedback measurements are provided to the control computer (202, FIG. 2) by the modem (214, FIG. 2) each time the beamlet weighting coefficients are varied. The beamlet weighting coefficients that correspond to the maximum SINR are the weighting coefficients that are desirable for a traffic channel for that communication device. In an alternate embodiment, the feedback from the modem could be in the form of soft-decision measurements.

Figure 7:
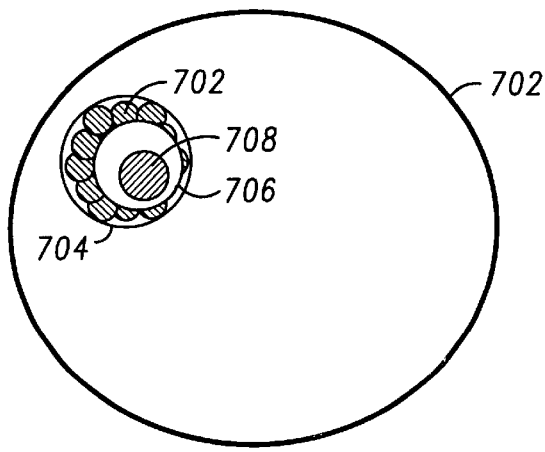
FIG. 7 illustrates a synchronization beam in accordance with a preferred embodiment of the present invention.

FIG. 7 illustrates a synchronization beam, within a satellite footprint 702, at a first, second, and third time in accordance with a preferred embodiment of the present invention. At a first time, synchronization beam 702 is comprised of a number of beamlets 704, desirably those beamlets that corresponded to the acquisition beam. At a second time, after varying the weighting coefficients of the beamlets within beam 702 and determining an improved SINR beamlet weighting, synchronization beam 706 has a smaller diameter. And at a third time, after varying the weighting coefficients of the beamlets within beam 706 and again increasing SINR, synchronization beam 708 has an even smaller diameter. Thus, a high-gain spot beam 708 is provided in the direction of the communication device, without apriori knowledge of its geographical location, and the weighting can be adjusted to form nulls in the direction of interferers (e.g., anywhere outside beam 708). In other words, by including the beamlets outside beam 708 in the weighting configuration, the system can reduce sidelobe levels.

Referring back to FIG. 6, after step 604, the location of the communication device is determined from the beamlet weighting coefficients in step 606. Essentially, the location is determined from the magnitude and phase of the beamlet weighting coefficients. Through knowledge of satellite location and attitude, the corresponding position on the ground can be ascertained through straightforward mathematical techniques.

The location determined in step 606 is subject to some error due, at least in part, to the granularity of the beamlets or the aperture of the antenna. For example, the location of the communication device could be determined as being within the beamlet having the heaviest weighting. However, a single beamlet may cover a relatively large area (e.g., several square miles). It may be desirable to pinpoint the communication device's location to a higher degree of accuracy. Thus, in a preferred embodiment, the location determined in step 606 is supplemented, in step 608, using timing (e.g., time-of-arrival measurements) and/or Doppler information from one or more satellites. Those of skill in the art know these techniques for location determination.

After the communication device's location is determined, a determination is made, in step 610, whether the communication device is within an area that could be covered by a currently-active traffic beam. This situation would occur when one or more other communication devices in the vicinity of the new communication device had already synchronized with the system, and were still communicating over a traffic channel. The determination of whether the communication device is within the area that could be covered by a currently-active traffic beam could be made, for example, by determining whether the communication device is within some threshold distance from the center of the currently-active traffic beam. Other techniques also could be used.

If the communication device is within an area that could be covered by a currently-active traffic beam, then the communication device is handed off to the currently-active beam in step 612, and the currently active beam provides a communication channel to the communication device. The beamlet weight adaptation process for the currently-active traffic beam is then made to include the newly acquired user in its weight adjustment process.

If the communication device is not within an area that could be covered by a currently-active traffic beam, then a new traffic beam is formed, in step 614, to provide service to that communication device. The communication device is then handed off to the new beam.

After step 612 or 614, the synchronization process is complete, and the communication device enters the tracking mode in step 616. The synchronization process then ends.

Figure 8:
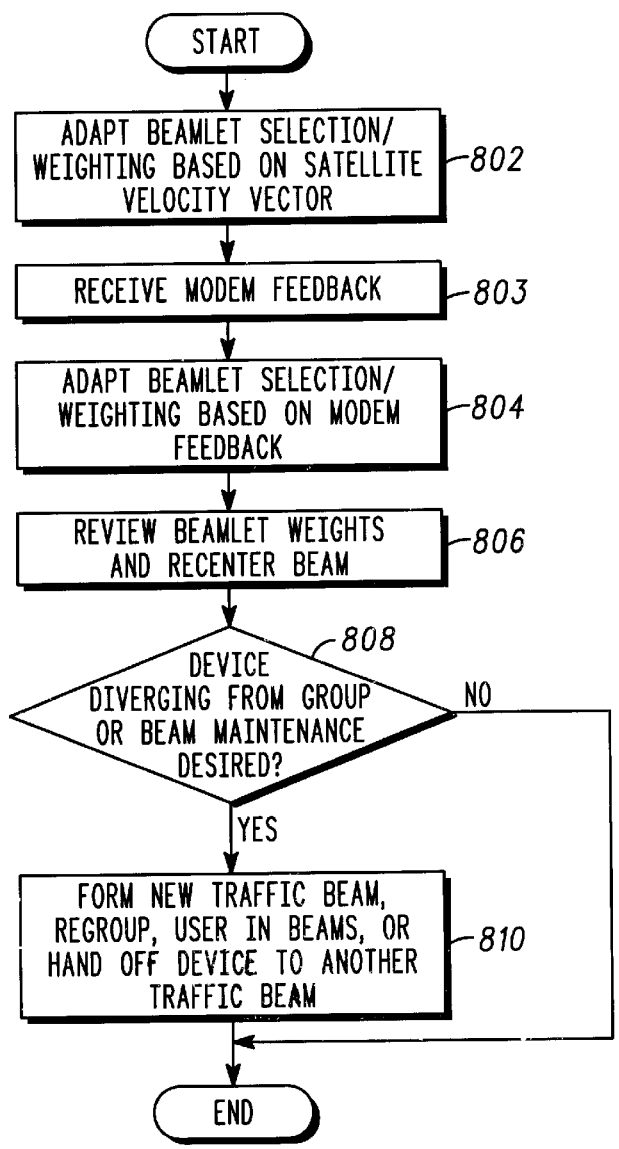
FIG. 8 illustrates a flowchart of a method for tracking a communication device in accordance with a preferred embodiment of the present invention.

FIG. 8 illustrates a flowchart of a method for tracking a communication device in accordance with a preferred embodiment of the present invention. Essentially, the tracking process involves tracking the traffic beam to the relative motion of the communication device and accounting for changes in system interference and link margin requirements during the duration of the communication device's call. The beamlet weighting used to determine mainlobe pointing, shape, and sidelobe characteristics are therefore continuously optimized. The tracking process involves three levels of tracking: a first level of tracking (step 802) that takes into account the satellite's relative motion with respect to the surface of the earth; a second level of tracking (steps 803–804) that adjusts beamlet weighting coefficients according to modem feedback; and a third level of tracking (steps 806–810) that accounts for movement of the communication device with respect to other communication devices in the group of communication devices serviced by a beam and performs beam maintenance and handoffs involving the regrouping of users within beams, if required.

The tracking process begins, in step 802, by adapting beamlet selection and weighting based on the satellite's velocity vector. Because the satellite is continuously moving with respect to the surface of the earth, and because the beamlets are satellite-fixed (rather than earth-fixed), then the area covered by the set of beamlets that initially form the traffic beam will soon diverge from the communication device's location. Because of this phenomenon, the control computer (202, FIG. 2) causes the beamlet selection switch (208, FIG. 2) and the beamlet combiner (210, FIG. 2) to migrate activation status and beamlet weighting coefficients from losing beamlets to gaining beamlets in relation to the satellite velocity vector. The satellite velocity vector is a known system parameter. Therefore, the switching of beamlet activation status and weighting coefficients from losing to gaining beamlets involves relatively straightforward mathematical calculations.

Conceptually, as a communication device approaches the boundary between a losing and a gaining beamlet, the activation and weighting status of the losing beamlet are migrated to the gaining beamlet. Because beamlets might not be aligned along the satellite velocity vector, this migration may involve distributing the activation and weighting status between multiple gaining beamlets.

Figure 9:
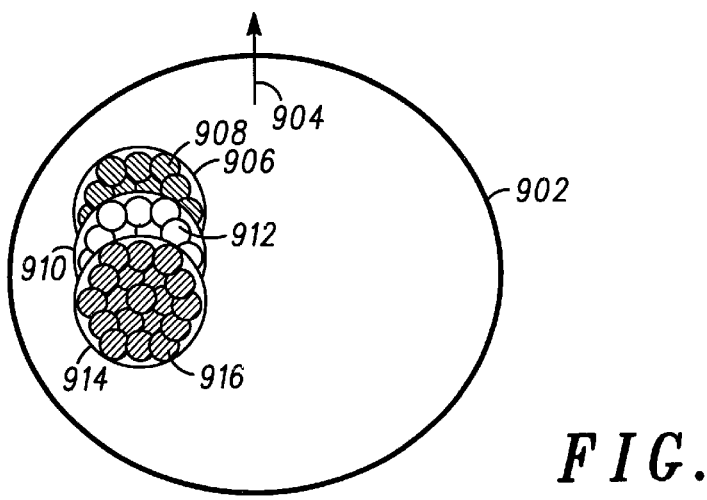
FIG. 9 illustrates the relative motion of a traffic beam with respect to a satellite's velocity vector in accordance with a preferred embodiment of the present invention.

FIG. 9 illustrates the relative motion of a traffic beam, within satellite footprint 902, with respect to a satellite's velocity vector in accordance with a preferred embodiment of the present invention. As the satellite moves along velocity vector 904, the relative location of the communication device would move downward through footprint 902. Accordingly, where a first set of beamlets 908 would be able to provide traffic beam 906 to a communication device at a first time, the system would adapt the beamlet activation and weighting to cause a second set of beamlets 912 to provide traffic beam 910 to the communication device at a second time. The system would continue this process, adapting the beamlet activation and weighting to cause a third set of beamlets 916 to provide traffic beam 914 to the communication device at a third time, and so on, until the communication device reaches the boundary of footprint 902. At that time, the communication device would be handed off to a gaining satellite.

In a preferred embodiment, inter-satellite handoff would involve the losing satellite sending activation and weighting information (e.g., weighting coefficients) and/or communication device location information to the gaining satellite (e.g., over a crosslink 112, FIG. 1). In an alternate embodiment, handoff could involve the gaining satellite looking into the losing satellite's footprint with an acquisition and/or synchronization beam, in order to determine what traffic beams need to be provided when communication devices migrate into the gaining satellite's footprint. Various other methods for handoff would be obvious to one of skill in the art based on the description herein.

Referring back to FIG. 8, a second level of tracking involves the control computer receiving modem feedback in step 803. Beamlet selection and weighting are then adapted, in step 804, based on the received modem feedback from multiple users simultaneously. Modem feedback, comprising multi-user SINR measurements, error measurements, and/or soft-decision information, is used to continuously adapt the complex weighting of the beamlets used to form the composite traffic beam in order to jointly maximize SINR for multiple simultaneous users within the beam. Provided that the communication devices remain within the space spanned by the beamlets used, the composite beam will remain focussed on the communication devices, regardless of the motion of the communication devices. This level of tracking also would enable the satellite to maintain the maximum SINR in the face of satellite attitude variations and interference conditions.

Figure 10:
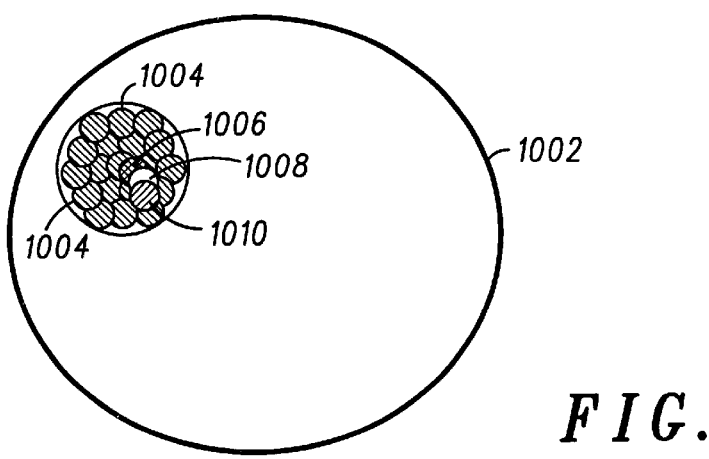
FIG. 10 illustrates the updating of beamlet weighting coefficients in order to provide fine tracking in accordance with a preferred embodiment of the present invention.

FIG. 10 illustrates the updating of beamlet weighting coefficients in order to provide fine tracking, within a satellite footprint 1002, in accordance with a preferred embodiment of the present invention. At a first time, beamlets 1004 are weighted such that the traffic beam provides service to a first area 1006. Subsequently, at a second and third time, beamlets 1004 are weighted such that the traffic beam provides service to second 1008 and third 1010 areas, respectively. The migration of the traffic beam within the set of beamlets 1004 is not as predictable as it is when accounting for the satellite velocity (step 802). Instead, the migration is somewhat more random, as is shown in FIG. 10. Note that, for ease of illustration, FIG. 10 does not illustrate the effects of satellite velocity on beamlet activation and weighting.

Referring back to FIG. 8, a third level of tracking is provided in steps 806–810 in order to account for movement of the communication device with respect to other communication devices in the group of communication devices serviced by a beam. Essentially, this tracking involves monitoring beamlet weighting coefficients to determine whether a communication device is diverging from the user group, and monitoring the user distribution to determine if a regrouping of users into different user groups is required.

In step 806, beamlet weighting coefficients are reviewed to determine whether it appears that a communication device is nearing the edge of the area spanned by the selected beamlets. If the beamlet weighting coefficients indicate that this has occurred, the beamlet selection switch (208, FIG. 2) is updated to recenter the traffic beam beamlets over the communication device, if possible.

Figure 11:
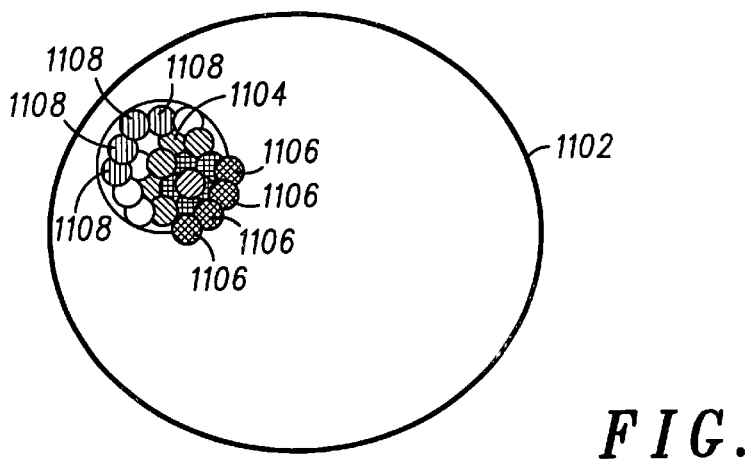
FIG. 11 illustrates the reselection of beamlets for formation of a traffic beam in order to provide fine tracking in accordance with a preferred embodiment of the present invention.

FIG. 11 illustrates the reselection of beamlets for formation of a traffic beam in order to provide fine tracking, within satellite footprint 1102, in accordance with a preferred embodiment of the present invention. In order to recenter the traffic beam 1104, one or more beamlets 1106 are added (i.e., activated and weighted) to the set of beamlets comprising the beam, and one or more beamlets 1108 are removed (i.e., deactivated) from the set of beamlets comprising the beam. Note that, for ease of illustration, FIG. 11 does not illustrate the effects of satellite velocity on beamlet activation and weighting.

Referring back to FIG. 8, the weight monitoring process also can assist the system to determine whether a communication device is diverging from the user group, necessitating a handoff of that communication device to a new or another existing traffic beam.

In step 808, a determination is made whether, based on the beamlet weighting coefficients reviewed in step 806, any particular communication device is diverging from the user group. A positive determination is triggered when it is becoming unfeasible for the traffic channel to be able to service the diverging communication device. Step 808 also determines if beam maintenance is desired. Beam maintenance is desired if, based on the change in user distribution over time, a different, more favorable user grouping would result in improved quality of service for the communication devices currently communicating within the traffic beam.

If the communication device is diverging from the user group, then in step 810 the communication device is handed off, if possible, to another existing traffic beam. A communication device may be considered near enough to another traffic beam, for example, if the communication device's SINR when communicating within that beam is above a particular threshold. Alternatively, the determination could be made based on the communication device's geographical proximity to other communication devices communicating within the other traffic beam, or to the estimated coverage area of the traffic beam.

If the communication device is not within an area covered by another beam, then a new traffic beam is formed for the communication device, and the communication device is handed off to that beam.

If beam maintenance is desired, then in step 810 the communication devices are regrouped into a new set of user groups, and users are handed off as required into different beams in order to improve overall link performance and quality of service.

Any or all of the three tracking levels could be performed periodically or continuously. Also, the tracking levels could be performed in parallel, rather than serially as is shown in FIG. 8. The tracking described in FIG. 8 is performed continuously or periodically in order to maintain link performance and user quality of service.

Thus, a method and apparatus for digital beamforming have been described that have specific advantages over prior art methods and apparatuses. In particular, prior art, earth-fixed, beam steering applications that attempt to keep a beam fixed to a particular geographical area only take into account satellite motion. In contrast, the method and apparatus of the present invention not only take satellite motion into account, but also utilizes modem feedback in order to jointly maximize multiple users' SINR and adapt the beam location and/or shape accordingly using complex beamlet weighting. In addition, beamlet weighting coefficients are varied using modem feedback in a manner that jointly minimizes multi-user error signals.

While a preferred embodiment has been described, those of skill in the art will understand, based on the description herein, that the apparatus and method of the present invention are not limited to satellite communication networks, but they may apply equally well to other types of systems (e.g., airborne or terrestrial cellular systems) where maximizing a communication device's SINR is desirable. In addition, those of skill in the art will recognize that changes and modifications may be made in the described embodiments without departing from the scope of the present invention. For example, the processes identified herein may be categorized and organized differently than described, while achieving equivalent results. Also, the steps in the processes could be performed in a different order than those described herein. These and other changes and modifications, which are obvious to those skilled in the art, are intended to be included within the scope of the present invention.

It is to be understood that the phraseology or terminology employed herein is for the purpose of description and not of limitation. Accordingly, the invention is intended to embrace all such alternatives, modifications, equivalents, and variations as fall within the spirit and broad scope of the appended claims.

What is claimed is:

1. A method for digital beamforming in a cellular communication system comprising:

projecting a plurality of beamlets from a satellite of the cellular communication system;

combining a first set of the plurality of beamlets to form a single traffic beam that covers a geographical area having multiple communication devices communicating within the single traffic beam with the cellular communication system, the multiple communication devices within the single traffic beam are considered a first user group;

evaluating modem feedback of the satellite that is related to a signal-to-interference+noise ratio (SINR) of a signal received by the satellite from one or more of the multiple communication devices, wherein the one or more signals are received within the single traffic beam provided by the satellite;

adapting weighting coefficients applied to the first set of beamlets based upon the modem feedback of the satellite;

reviewing the weighting coefficients to determine whether, based on a change in user distribution over time, a second user group would result in improved quality of service for the multiple communication devices currently communicating within the single traffic beam; and if the change would result in the improved quality of service, regrouping the communication devices into the first user group and the second user group, and handing off the communication devices to traffic beams associated with the first user group and the second user group.

2. A method for digital beamforming in a cellular communication system comprising:

projecting a plurality of beamlets from a satellite of the cellular communication system;

combining a first set of the plurality of beamlets to form a single traffic beam that covers a geographical area having a communication device communicating with the cellular communication system;

evaluating modem feedback of the satellite that is related to a signal-to-interference+noise ratio (SINR) of signal received by the satellite from one or more communication devices, wherein the one or more signals are received within the single traffic beam provided by the satellite;

adapting weighting coefficients applied to the first set of beamlets based upon the modem feedback of the satellite;

prior to providing the single traffic beam to one of the one or more communication devices, providing a synchronization beam toward the one communication device, wherein the synchronization beam is formed from a second set of beamlets;

varying the weighting coefficients of the second set of beamlets to find a combination of weighting coefficients that results in a maximum SINR for the one communication device;

determining a location of the one communication device from the combination; and handing off the one communication device to a traffic beam that covers the location.

3. The method as claimed in claim 2, wherein the step of handing off comprises:

determining, based on the location, if a currently active beam can provide a communication channel to the one communication device;

if the currently-active beam can provide the communication channel, handing off the one communication device to the currently-active beam; and if no currently active beam can provide the communication channel, forming a new traffic beam and handing the one communication device off to the new traffic beam.

4. The method as claimed in claim 2, further including an acquisition process comprising:

prior to the synchronization process for the one communication device, providing an acquisition beam within a field of view of the satellite, wherein the acquisition beam is formed from a third set of beamlets;

demodulating a signal received within the acquisition beam;

determining, from the signal, whether a communication device located within an area covered by the acquisition beam is attempting to acquire the cellular communication system;

if a communication device is attempting to acquire, executing the synchronization process for that communication device;

forming the acquisition beam from another set of beamlets; and repeating the acquisition process to identify other communication devices attempting to acquire the cellular communication system.

5. A method for digital beamforming in a cellular communication system comprising:

providing a plurality of beamlets from a satellite of the cellular communication system;

combining a first set of the plurality of beamlets to form an acquisition beam within a field of view of the satellite;

demodulating a signal received with the acquisition beam;

determining, from the signal, whether a communication device located within an area covered by the acquisition beam is attempting to acquire the cellular communication system;

if a communication device is attempting to acquire, entering a synchronization mode for that communication device, wherein the synchronization mode synchronizes with the communication device based on modern feedback;

reforming the acquisition beam from another set of beamlets; and repeating the demodulating, determining, entering, reforming, and repeating to identify other communication devices attempting to acquire the cellular communication system.

6. The method as claimed in claim 5, wherein entering the synchronization mode comprises:

providing a synchronization beam toward the communication device, wherein the synchronization beam is formed from a second set of beamlets;

varying weighting coefficients applied to the second set of beamlets to find a combination of weighting coefficients that results in a maximum signal-to-interference+noise ratio (SINR) for the communication device, wherein the maximum SINR is determined from the modem feedback;

determining a location of the communication device from the combination; and handing off the communication device to a traffic beam that covers the location.

7. The method as claimed in claim 6, wherein handing off the communication device comprises:

determining, based on the location, if a currently active beam can provide a communication channel to the communication device;

if the currently-active beam can provide the communication channel, handing off the communication device to the currently-active beam; and if no currently active beam can provide the communication channel, forming a new traffic beam and handing the communication device off to the new traffic beam.

8. The method as claimed in claim 6, further comprising receiving additional modem feedback that is related to the SINR of the signal, wherein the signal is received within the traffic beam and the traffic beam is formed from a third set of beamlets; and adapting, based on the additional modem feedback, the weighting coefficients applied to the third set of beamlets.

9. The method as claimed in claim 8, wherein adapting comprises adapting the weighting coefficients applied to the third set of beamlets in order to maximize the SINR of the signal.

10. The method as claimed in claim 8, further comprises adapting the weighing coefficients based on a velocity vector of the satellite.

11. The method as claimed in claim 8, further comprising:

reviewing the weighting coefficients to determine whether the communication device is diverging from other communication devices communicating within the traffic beam; and if the communication device is diverging, handing off the communication device to another traffic beam.

12. An apparatus for digital beamforming in a cellular communication system comprising:

an antenna subsystem that is configured to project one or more traffic beams toward one or more communication devices;

a beamlet former, coupled to the antenna subsystem, that is configured to provide a plurality of beamlets for formation of the one or more traffic beams;

a beamlet selection switch configured to activate a first set of the plurality of beamlets for formation of a single traffic beam of the one or more traffic beams;

a beamlet combiner that applies weighting coefficients to the first set of the plurality of beamlets;

a modem for demodulating signals received from the communication devices; and a control computer that receives feedback from the modem, and that controls the beamlet combiner based on the feedback.

* * * * *